(12) United States Patent
Yamane et al.

(10) Patent No.: US 10,605,404 B2
(45) Date of Patent: Mar. 31, 2020

(54) LUBRICANT INJECTION SYSTEM

(71) Applicant: KAWASAKI JUKOGYO KABUSHIKI KAISHA, Kobe-shi, Hyogo (JP)

(72) Inventors: Hideshi Yamane, Kakogawa (JP); Jun Takebayashi, Kakogawa (JP); Shuhei Kuraoka, Akashi (JP); Tatsuhiro Uto, Akashi (JP); Shinichi Fujisawa, Ashiya (JP); Hiroyuki Mizumoto, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 329 days.

(21) Appl. No.: 15/576,324

(22) PCT Filed: May 16, 2016

(86) PCT No.: PCT/JP2016/002386
§ 371 (c)(1),
(2) Date: Nov. 22, 2017

(87) PCT Pub. No.: WO2016/189825
PCT Pub. Date: Dec. 1, 2016

(65) Prior Publication Data
US 2018/0156384 A1 Jun. 7, 2018

(30) Foreign Application Priority Data
May 22, 2015 (JP) .................. 2015-104852

(51) Int. Cl.
*F16N 7/38* (2006.01)
*B25J 19/00* (2006.01)
(Continued)

(52) U.S. Cl.
CPC .............. *F16N 7/38* (2013.01); *B25J 13/08* (2013.01); *B25J 13/087* (2013.01);
(Continued)

(58) Field of Classification Search
CPC .... F16N 7/38; F16N 2270/20; B25J 19/0062; B25J 13/08; B25J 19/66; B25J 13/087; F01M 1/02
(Continued)

(56) References Cited

U.S. PATENT DOCUMENTS

| 6,484,067 B1 * | 11/2002 | Kinoshita | ............ B25J 19/0062 |
| | | | 277/534 |
| 2008/0274865 A1 * | 11/2008 | Sturm | ................... B23P 19/001 |
| | | | 483/15 |

(Continued)

FOREIGN PATENT DOCUMENTS

| JP | H04-240091 A | 8/1992 |
| JP | 2000-176985 A | 6/2000 |

(Continued)

OTHER PUBLICATIONS

JPH 04-240091 (mechanical translation) Aug. 1992 Robot with Oil Supply Device (Year: 1992).*

(Continued)

*Primary Examiner* — Michael R Mansen
*Assistant Examiner* — Mark K Buse
(74) *Attorney, Agent, or Firm* — Oliff PLC

(57) ABSTRACT

A lubricant injection system is provided, which includes a pedestal, a robotic arm including a plurality of arm bodies sequentially coupled from pedestal, lubricant injecting hand having a discharge part configured to be sequentially coupled to each of a plurality of filler ports of a target machine, robot control device configured to control operation of robotic arm, a lubricant pumping device in which pumping of lubricant is controlled, a lubricant pumping channel configured to lead lubricant from the lubricant pumping device to the discharge part, and a flow rate sensor provided to the lubricant pumping channel and configured to (Continued)

send the detected flow rate information to the robot control device. Robot control device calculates an injection quantity based on the flow rate information sent from flow rate sensor, and when calculated injection quantity reaches target injection quantity, robot control device controls to stop pumping of lubricant.

1 Claim, 4 Drawing Sheets

(51) Int. Cl.
  *F16N 7/14*    (2006.01)
  *B25J 13/08*   (2006.01)
  *F01M 1/02*    (2006.01)
(52) U.S. Cl.
  CPC ....... *B25J 19/0062* (2013.01); *B25J 19/0066* (2013.01); *F01M 1/02* (2013.01); *F16N 7/14* (2013.01); *F16N 2270/20* (2013.01)
(58) Field of Classification Search
  USPC .......................................................... 184/26
  See application file for complete search history.

(56) References Cited

U.S. PATENT DOCUMENTS

| | | | |
|---|---|---|---|
| 2013/0277150 A1* | 10/2013 | Belik | F16N 13/00 |
| | | | 184/26 |
| 2014/0193263 A1 | 7/2014 | Pasquet | |
| 2018/0143098 A1* | 5/2018 | Yamane | G01M 3/26 |
| 2018/0156384 A1* | 6/2018 | Yamane | B25J 13/08 |
| 2019/0039244 A1* | 2/2019 | Sato | B25J 19/0062 |
| 2019/0054614 A1* | 2/2019 | Ohtsubo | B25J 9/102 |
| 2019/0283258 A1* | 9/2019 | Takizawa | B25J 19/02 |

FOREIGN PATENT DOCUMENTS

| | | |
|---|---|---|
| JP | 2006-002790 A | 1/2006 |
| JP | 2006-334700 A | 12/2006 |
| JP | 2013-006244 A | 1/2013 |
| JP | 2014-226717 A | 12/2014 |

OTHER PUBLICATIONS

International Search Report issued in International Patent Application No. PCT/JP2016/002386.
Jan. 24, 2017 Office Action issued in Taiwanese Patent Application No. 105115305.

\* cited by examiner

LUBRICANT INJECTION SYSTEM

TECHNICAL FIELD

The present disclosure relates to a lubricant injection system, and especially to a lubricant injection system which injects lubricant into a machine having a plurality of filler ports.

BACKGROUND ART

Many industrial machines are provided therein with various mechanical elements, such as gears and bearings. Lubricant, such as oil or grease, is supplied to these mechanical elements in order to smoothen motions and improve durability of the mechanical elements.

As one system which supplies lubricant, for example, in FIG. 3 of Patent Document 1, a lubricant supplying apparatus for supplying lubricant to external devices is disclosed. The lubricant supplying apparatus includes a lubricant tank where lubricant is stored, a pump device attached to an opening of the lubricant tank, a control device which sends an operative instruction to the pump device, and a tube extending from the lubricant tank. In the lubricant supplying apparatus, a quantity of lubricant to be supplied is inputted into the control device, and the pump device which is actuated in accordance with the operative instruction sent from the control device sends the set quantity of lubricant to the tube from the lubricant tank, and lubricant is discharged from a discharge part at a tip end of the tube.

REFERENCE DOCUMENT OF CONVENTIONAL ART

Patent Document

[Patent Document 1] JP2006-002790A

DESCRIPTION OF THE DISCLOSURE

Problems to be Solved by the Disclosure

Meanwhile, in order to directly supply lubricant from the lubricant supplying apparatus described above to a machine, such as an industrial machine, it is necessary to attach the discharge part at the tip end of the tube etc. extending from the lubricant tank to a filler port of lubricant which the machine has. However, if the machine into which lubricant is injected (hereinafter, referred to as the "target machine") has a plurality of filler ports, an operation in which, each time an injection of lubricant is completed for one of the filler ports, the discharge part is moved and attached to another filler port, is required. In addition, the quantity of lubricant to be injected often differs for each filler port. In such a case, a worker needs to set in the control device the injection quantity corresponding to the filler port to which the discharge part is attached. Thus, it is time-consuming, and the worker may mistakenly set the injection quantity. Therefore, the worker is forced a great labor when using the lubricant supplying apparatus described above for the target machine having the plurality of filler ports. As a system which injects lubricant into the target machine having the plurality of filler ports, there is a centralized greasing system in which a distributing valve etc. is provided in piping through which lubricant is pumped from a single pump, and lubricant of a given quantity is supplied to many filler ports. However, such a system will lead to a complication of the entire system, if it is applied to the target machine where the plurality of filler ports are scatteringly provided.

Thus, the purpose of the present disclosure is to provide a simplified lubricant injection system, capable of reducing labor of an injecting operation of lubricant into each filler port of a target machine having a plurality of filler ports, and capable of injecting an exact quantity of lubricant into each filler port.

Summary of the Disclosure

In order to solve the problem, according to one aspect of the present disclosure, a lubricant injection system is provided, which injects lubricant into a target machine having a plurality of filler ports. The system includes a pedestal, a robotic arm including a plurality of arm bodies sequentially coupled from the pedestal, a lubricant injecting hand, having a discharge part configured to be sequentially coupled to each of the plurality of filler ports and discharges lubricant, and attached to a tip-end part of the robotic arm so as to be attachable thereto and detachable therefrom, a robot control device configured to control operation of the robotic arm, a lubricant pumping device, of which pumping of lubricant is controlled by the robot control device, a lubricant pumping channel configured to lead lubricant from the lubricant pumping device to the discharge part, and a flow rate sensor provided to the lubricant pumping channel and configured to send the detected flow rate information to the robot control device. The robot control device stores a target injection quantity corresponding to each of the plurality of filler ports. When the discharge part is connected to any one of the plurality of filler ports, the robot control device controls the lubricant pumping device to start the pumping of lubricant. The robot control device calculates an injection quantity of lubricant injected from the filler port connected to the discharge part based on the flow rate information sent from the flow rate sensor. When the calculated injection quantity reaches the target injection quantity corresponding to the filler port connected to the discharge part, the robot control device controls the lubricant pumping device so as to stop the pumping of lubricant.

According to the configuration, the operation of the robotic arm is controlled by the robot control device to connect the discharge part of the lubricant injecting hand to the filler port of the target machine. Thus, it becomes unnecessary for a worker to manually attach and detach the discharge part to/from the filler port. Therefore, labor of the injecting operation of lubricant into the filler port is reduced. Moreover, since the pumping of lubricant is stopped when the calculated injection quantity reaches the corresponding target injection quantity based on the information sent from the flow rate sensor, an exact quantity of lubricant can be injected into each filler port. Moreover, even if the plurality of filler ports are scatteringly provided in the target machine, since the discharge part is sequentially coupled to each of the plurality of filler ports, it is unnecessary to provide the lubricant pumping channel for each filler port and a simplified lubricant injection system can be established.

Effects of the Disclosure

According to the present disclosure, the simplified lubricant injection system, which is capable of injecting an exact quantity of lubricant into each filler port, and capable of reducing the labor of the injecting operation of lubricant into each filler port of the target machine having the plurality of filler ports, is provided.

MODE FOR CARRYING OUT THE DISCLOSURE

Figure 1:
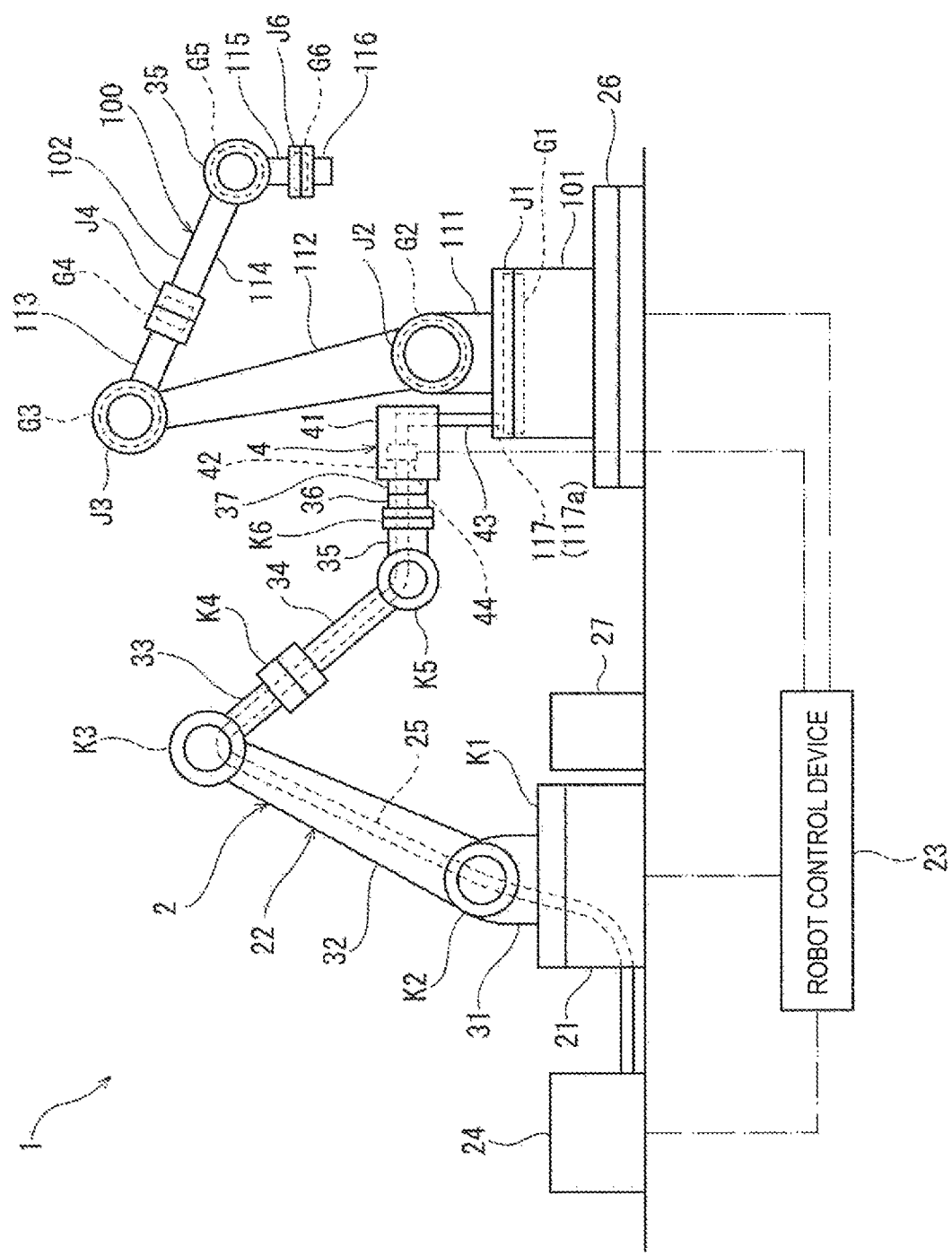
FIG. 1 is a schematic structural view of a lubricant injection system according to one embodiment of the present disclosure.

Hereinafter, one embodiment of the present disclosure is described with reference to the accompanying drawings. FIG. 1 is a schematic structural view of a lubricant injection system 1 according to one embodiment of the present disclosure. Below, as one example of a target machine into which the lubricant injection system 1 injects lubricant, an articulated robot 100 as illustrated on the right side of FIG. 1 is described. Lubricant in this embodiment is, for example, grease, and lubricant injecting places G1-G6 (described later) are grease baths, for example.

First, the articulated robot 100 which is a target machine of the lubricant injection system 1 of this embodiment is described. As illustrated in FIG. 1, the articulated robot 100 includes a pedestal 101, and a robotic arm 102 coupled to the pedestal 101. The robotic arm 102 includes six arm bodies 111-116, such as a first arm body 111, a second arm body 112, a third arm body 113, a fourth arm body 114, a fifth arm body 115, and a sixth arm body 116. The arm bodies 111-116 are sequentially coupled to each other in this order from the pedestal 101. That is, the first arm body 111 is coupled at a base-end part to the pedestal 101, the second arm body 112 is coupled at a base-end part to a tip-end part of the first arm body 111, and similarly for the rest, the sixth arm body 116 is coupled at a base-end part to a tip-end part of the fifth arm body 115. A tip-end part of the robotic arm 102, i.e., a tip-end part of the sixth arm body 116, is constructed so that a hand for performing a given operation, such as a welding operation and a painting operation, is detachable and attachable.

The articulated robot 100 includes a plurality of joint parts J1-J6. Each of the joint parts J1-J6 rotatably couples one of two adjacent members among the pedestal 101 and the arm bodies 111-116 which are sequentially coupled, which is disposed opposite from the pedestal 101, to the other member disposed on the pedestal 101 side. In this embodiment, since the total number of the pedestal 101 and the arm bodies 111-116 is seven, the number of pairs of the adjacent members is six and the number of the joint parts J1-J6 is also six.

Mechanical elements (not illustrated), such as a transmission and bearings, are incorporated into each of the joint parts J1-J6. In order to smoothly operate the mechanical elements, the lubricant injecting places G1-G6 for fluid-tightly containing lubricant therein are formed in the joint parts J1-J6, respectively. Each of the lubricant injecting places G1-G6 has at least one filler port 117 which communicates with the exterior. Since the lubricant injecting places G1-G6 are disposed so as to be separated from each other, the articulated robot 100 has at least six filler ports 117 which are scatteringly provided. Moreover, some of the plurality of filler ports 117 which are scatteringly provided differ in an injecting direction from each other. Lubricant is injected into the lubricant injecting places G1-G6 from the filler ports 117, respectively. Note that, in FIG. 1, only one filler port 117 which one lubricant injecting place G1 among the lubricant injecting places G1-G6 has is illustrated. Other filler ports 117 and other communicating ports (e.g., discharge ports) which communicate with the exterior are omitted for simplification. Moreover, below, when one arbitrary lubricant injecting place is indicated, it is referred to as "the lubricant injecting place G."

Next, a structure of the lubricant injection system 1 is described. The lubricant injection system 1 includes an articulated robot 2 as illustrated on the left side of FIG. 1, and a robot control device 23 which controls operation of the articulated robot 2.

As illustrated in FIG. 1, the articulated robot 2 includes a pedestal 21 and a robotic arm 22 coupled to the pedestal 21. The robotic arm 22 includes six arm bodies 31-36, such as a first arm body 31, a second arm body 32, a third arm body 33, a fourth arm body 34, a fifth arm body 35, and a sixth arm body 36. The arm bodies 31-36 are sequentially coupled in this order from the pedestal 21. That is, the first arm body 31 is coupled at a base-end part to the pedestal 21, the second arm body 32 is coupled at a base-end part to a tip-end part of the first arm body 31, and similarly for the rest, the sixth arm body 36 is coupled at a base-end part to a tip-end part of the fifth arm body 35.

The articulated robot 2 of the lubricant injection system 1 includes a plurality of joint parts K1-K6, similar to the articulated robot 100 which is the target machine. Each of the joint parts K1-K6 has a drive motor 38 (see FIG. 3) which rotates one of the two adjacent members among the pedestal 21 and the arm bodies 31-36 which are sequentially coupled, which is disposed opposite from the pedestal 21, with respect to the other member disposed on the pedestal 21 side. The drive motor 38 is a servo motor, for example. Moreover, the joint parts K1-K6 have rotation sensors 39 (see FIG. 3) which detect rotational states of the arm bodies 31-36 which are rotated by the drive motors 38, respectively. The rotation sensor 39 is an encoder, for example.

In FIG. 1, although a case where the pedestal 21 is fixed to a horizontal floor surface of an operation field is illustrated, it may be installed on a non-horizontal surface, or may be suspended from above, or may be movably installed. Moreover, in FIG. 1, although a so-called vertical articulated 6-axis robot is illustrated as the articulated robot 2 of the lubricant injection system 1, it is merely an example and is suitably applicable to other types of robots.

A holding part 37 which holds the hand which performs the given operation is provided to a tip-end part of the robotic arm 22, i.e., a tip-end part of the sixth arm body 36. Since the holding part 37 holds the hand, the robotic arm 22 is replaceably attached to the hand. In this embodiment, a lubricant injecting hand 4 for injecting lubricant into the lubricant injecting place G is attached to the robotic arm 22. Before attached to the robotic arm 22, the lubricant injecting hand 4 is accommodated in a hand holder 27 which is disposed within an operating range of the robotic arm 22, and is replaceably attached by the holding part 37 in the hand holder 27.

Moreover, the lubricant injection system 1 includes a turntable 26 where the articulated robot 100 which is the target machine is placed. The turntable 26 has a rotation mechanism (not illustrated). The turntable 26 is constructed so that it rotates the placed target machine centering on a vertical rotational axis by being driven by the rotation mechanism. The operation of the rotation mechanism of the turntable 26 is controlled by the robot control device 23.

The lubricant injection system 1 includes a lubricant pumping device 24, and an upstream lubricant pumping channel 25 which leads from the lubricant pumping device 24 to the lubricant injecting hand 4. The robot control device 23 controls pumping of lubricant to the lubricant injecting hand 4 by the lubricant pumping device 24. The upstream lubricant pumping channel 25 extends from the lubricant pumping device 24 to the pedestal 21, and further extends from the pedestal 21 to the holding part 37 along the robotic arm 22. Note that, herein, in the pumping channel through which lubricant is pumped from the lubricant pumping device 24 to the lubricant injecting place G, the lubricant pumping device 24 side is referred to as "upstream" and the lubricant injecting place G side is referred to as "downstream."

Figure 2:
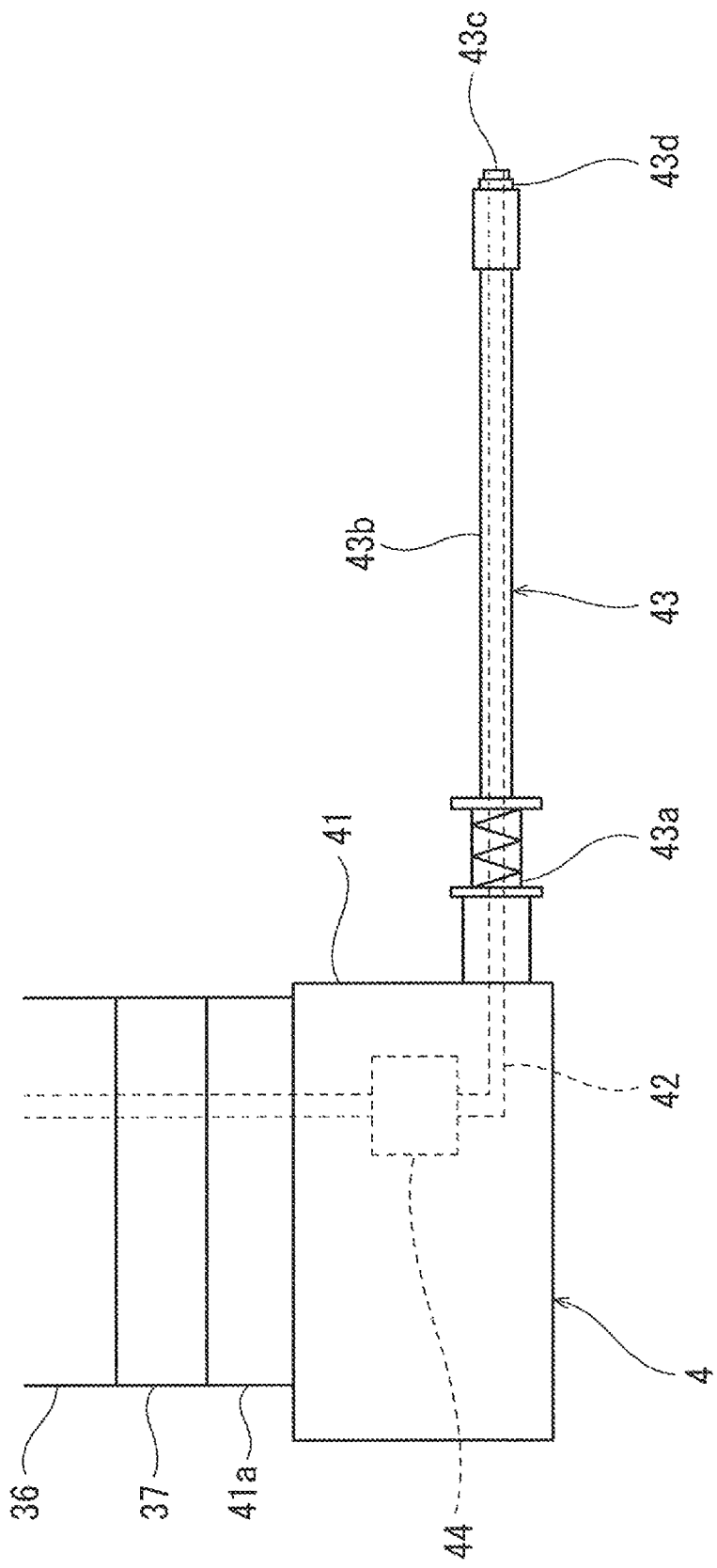
FIG. 2 is a schematic side view of a lubricant injecting hand.

FIG. 2 is a schematic side view of the lubricant injecting hand 4 held by the holding part 37 of the robotic arm 22. The lubricant injecting hand 4 includes an exterior frame 41, a downstream lubricant pumping channel 42, a discharge part 43, and a flow rate sensor 44.

A part 41a to be held which is held by the holding part 37 of the robotic arm 22 is provided to the exterior frame 41. The exterior frame 41 supports the downstream lubricant pumping channel 42, the discharge part 43, and the flow rate sensor 44.

The downstream lubricant pumping channel 42 is connected to the upstream lubricant pumping channel 25 when the part 41a to be held is held by the holding part 37. The downstream lubricant pumping channel 42 is supported by the exterior frame 41. The "lubricant pumping channel" of the present disclosure is comprised of the upstream lubricant pumping channel 25 and the downstream lubricant pumping channel 42, and leads lubricant from the lubricant pumping device 24 to the discharge part 43.

The discharge part 43 is sequentially connected to each of the plurality of filler ports 117 of the articulated robot 100 which is the target machine to discharge lubricant. Here, connecting between the discharge part 43 and the filler port 117 is being a state where lubricant discharged from the discharge part 43 is able to be injected into the lubricant injecting place G. In this embodiment, the discharge part 43 is formed in a pipe shape, and an opening at one end is coupled to the downstream lubricant pumping channel 42. The discharge part 43 is supported by the exterior frame 41, and is formed so as to extend linearly from the exterior frame 41.

The discharge part 43 includes a cushion mechanism 43a fixed to the exterior frame 41, a rod part 43b supported by the cushion mechanism 43a, a discharge port 43c provided to one end of the rod part 43b, and a sealing part 43d provided around the discharge port 43c. The cushion mechanism 43a is comprised of a coil spring and a linear bush, and pivotably supports the rod part 43b in longitudinal directions with respect to the exterior frame 41. The rod part 43b is hollow, and it is formed so that lubricant sent from the cushion mechanism 43a side is discharged from the discharge port 43c. When injecting lubricant into the lubricant injecting place G, the sealing part 43d seals the filler port 117 in a state where the discharge port 43c faces an internal space of the lubricant injecting place G. When the filler port 117 connects to the discharge part 43, the sealing part 43d is located opposing to the filler port 117 by operation of the robotic arm 22 so that the rod part 43b is in agreement with the injecting direction of the filler port 117. The sealing part 43d is then pressed perpendicularly against the filler port 117 by operation of the robotic arm 22. The sealing part 43d is made of, for example, urethane in order to improve airtightness.

The flow rate sensor 44 detects a flow rate of lubricant pumped from the lubricant pumping device 24 to the discharge part 43. In this embodiment, the flow rate sensor 44 is provided to the downstream lubricant pumping channel 42. Flow rate information acquired by the flow rate sensor 44 is sent to the robot control device 23 via signal lines (not illustrated).

Figure 3:
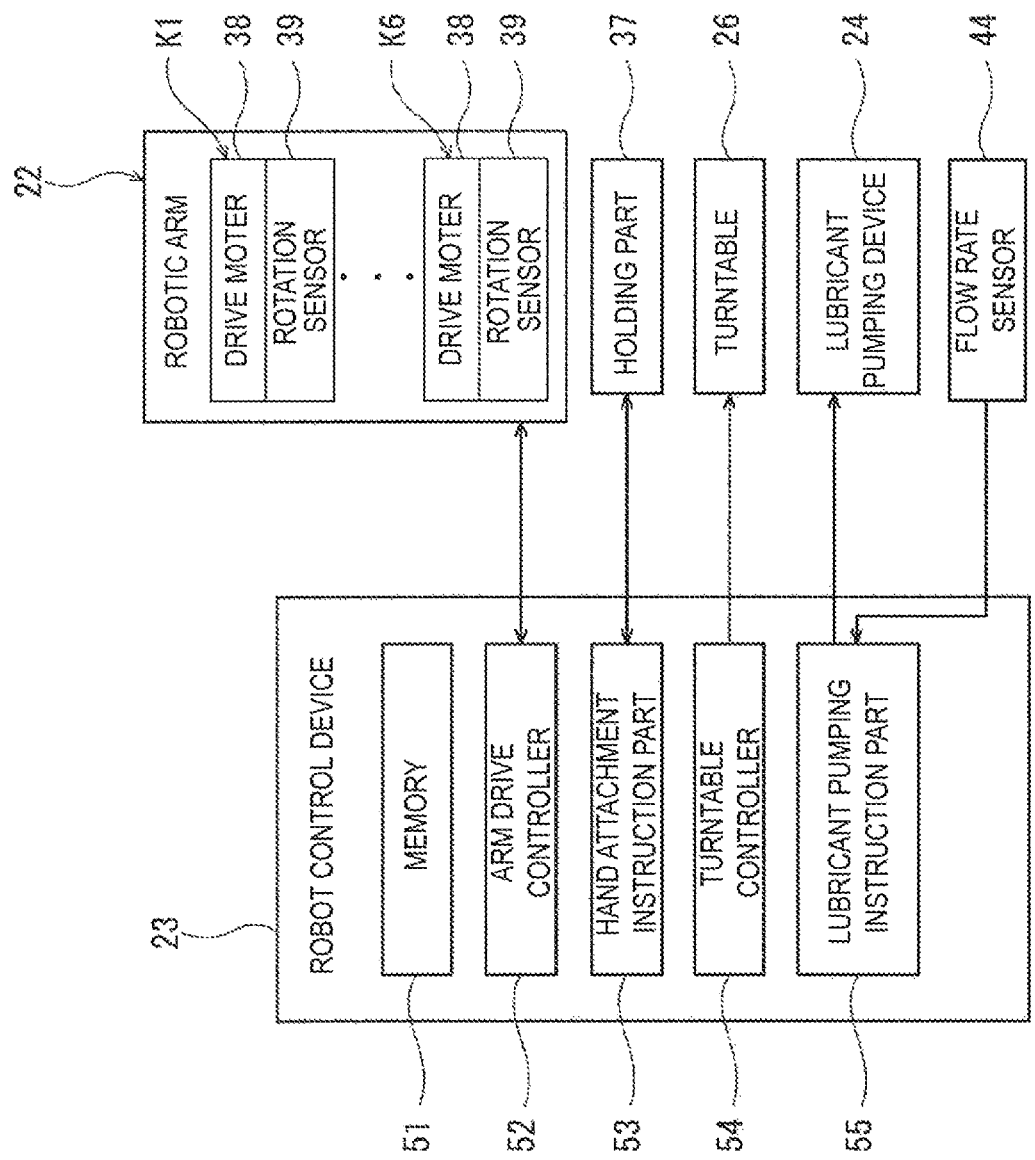
FIG. 3 is a block diagram illustrating a control structure of a robot control device.

FIG. 3 illustrates a control structure of the robot control device 23. The robot control device 23 not only controls operation of the robotic arm 22, but also controls each element related to the injecting operation of lubricant to the lubricant injecting place G. The robot control device 23 is comprised of a computing unit, such as a micro controller or a logic circuit, for example. The robot control device 23 includes a memory 51, an arm drive controller 52, a hand attachment instruction part 53, a turntable controller 54, and a lubricant pumping instruction part 55, and it achieves the functional blocks 51-55 by the computing unit described above operating in accordance with program(s) etc.

The memory 51 stores various programs and information. In this embodiment, the memory 51 stores operational program(s) for connecting the lubricant injecting hand 4 to each of the plurality of filler ports 117 of the articulated robot 100 which is the target machine placed on the turntable 26. Moreover, the memory 51 stores a target injection quantity corresponding to each of the plurality of filler ports 117. The target injection quantity is a target total quantity of lubricant supplied to the lubricant injecting place G through the corresponding filler port 117. Moreover, the memory 51 stores operational program(s) etc. for rotating the turntable 26.

The arm drive controller 52 controls the drive motor 38 etc. based on the operational program(s) stored in the memory 51 so that the attached hand, such as the lubricant injecting hand 4, is moved to the target position and into the target orientation. The rotation sensor 39 transmits an angular displacement signal related to an angular displacement of the corresponding drive motor 38 to the arm drive controller 52, and the arm drive controller 52 carries out a feedback control of the operation of the drive motor 38 based on the received angular displacement signal.

The hand attachment instruction part 53 controls attachment and detachment of the hand by the holding part 37. When attaching the hand accommodated in the hand holder 27 to the robotic arm 22, the hand attachment instruction part 53 sends a signal so that the holding part 37 holds the hand after contacting the holding part 37 to the hand. When accommodating the hand attached to the robotic arm 22 in the hand holder 27, the hand attachment instruction part 53 sends a signal so that the holding part 37 releases the holding state of the hand in a state where the hand attached to the robotic arm 22 is accommodated in the hand holder 27.

The turntable controller 54 controls operation of the rotation mechanism of the turntable 26 based on the operational program(s) stored in the memory 51. The turntable controller 54 rotates the turntable 26 to move the filler port 117 of the target machine on the turntable 26 to a given position.

The lubricant pumping instruction part 55 controls start and stop of pumping of lubricant to the lubricant injecting hand 4 from the lubricant pumping device 24. When the discharge part 43 of the lubricant injecting hand 4 is connected to the filler port 117, the lubricant pumping instruction part 55 controls the lubricant pumping device 24 to start pumping of lubricant. The lubricant pumping instruction part 55 calculates the injection quantity of lubricant injected from the filler port 117 connected to the discharge part 43 based on the flow rate information sent from the flow rate sensor 44 after the start of pumping of lubricant. Then, when the calculated injection quantity reaches a corresponding target injection quantity, the lubricant pumping instruction part 55 controls the lubricant pumping device 24 to stop the pumping of lubricant.

Figure 4:
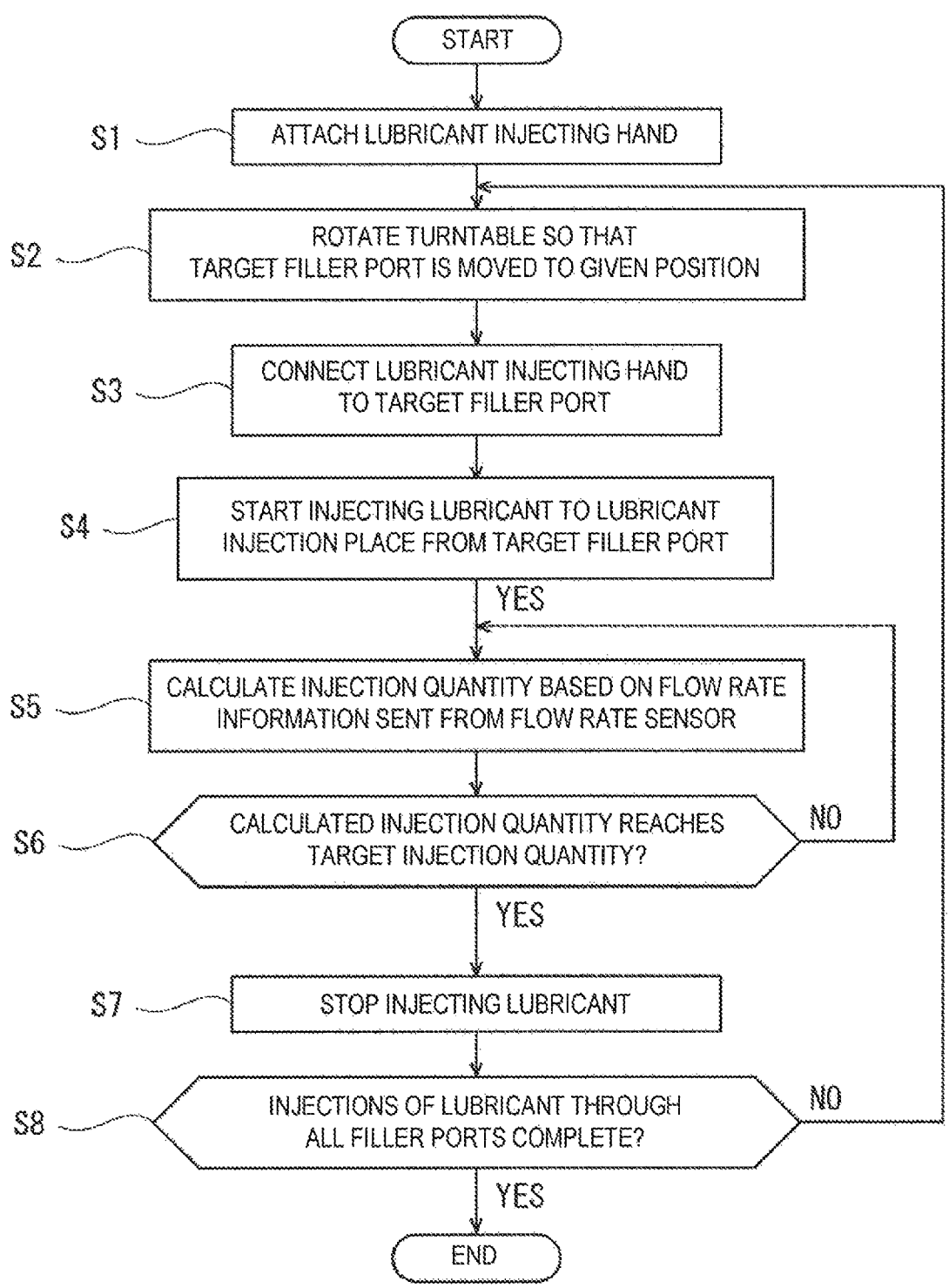
FIG. 4 is a flowchart illustrating a control flow of the robot control device in a lubricant injecting operation.

Below, a flow of lubricant injecting operation in which lubricant is injected into the lubricant injecting place G of the articulated robot 100 which is the target machine by using the lubricant injection system 1 is described. FIG. 4 is a flowchart illustrating a control flow of the robot control device 23 in the lubricant injecting operation by the lubricant injection system 1.

The lubricant injecting operation by the lubricant injection system 1 according to this embodiment starts after the articulated robot 100 which is the target machine is placed on the turntable 26 in a given state (posture, position, orientation, etc.).

Before starting the lubricant injecting operation by the lubricant injection system 1, the operational program(s) for connecting the lubricant injecting hand 4 to each of the plurality of filler ports 117 of the articulated robot 2 placed on the turntable 26 is stored beforehand in the memory 51 of the robot control device 23. Moreover, the target injection quantity corresponding to each of the plurality of filler ports 117 is stored beforehand in the memory 51 of the robot control device 23.

When an instruction indicative of starting the lubricant injecting operation is inputted into the robot control device 23, the robot control device 23 attaches the lubricant injecting hand 4 to the tip-end part of the robotic arm 22 (Step S1). Specifically, the robot control device 23 operates the drive motor 38 etc. of each of the joint parts K1-K6 to contact the holding part 37 at the tip-end part of the robotic arm 22 to the lubricant injecting hand 4 accommodated in the hand holder 27. Then, an instruction is sent from the robot control device 23 so that the holding part 37 holds the lubricant injecting hand 4 to attach the lubricant injecting hand 4 to the tip-end part of the robotic arm 22.

Next, the robot control device 23 controls the turntable 26 and the robotic arm 22 so that the discharge part 43 connects with a target one of the plurality of filler ports 117.

Specifically, if the target one of the plurality of filler ports 117 is not located at a given position, the robot control device 23 rotates the turntable 26 so that the target filler port 117a is moved to the given position (Step S2). Here, the "given position" is a position defined beforehand, at which the discharge part 43 is to be connected to the filler port 117 in accordance with the operational program(s) stored in the memory 51 (e.g., at the time of teaching to the articulated robot 2).

Then, the robot control device 23 operates the robotic arm 22 to connect the discharge part 43 of the lubricant injecting hand 4 to the filler port 117 (Step S3). Specifically, the robot control device 23 controls the operation of the robotic arm 22 to move the discharge part 43 of the lubricant injecting hand 4 and connect it to the target filler port 117a. Thus, it becomes in a state where lubricant discharged from the discharge part 43 is able to be injected into the lubricant injecting place G.

When the connection to the target filler port 117a is completed, the robot control device 23 starts an injection of lubricant to the lubricant injecting place G from the target filler port 117a (Step S4). Specifically, the robot control device 23 sends a signal to start pumping lubricant to the lubricant pumping device 24 so as to start pumping lubricant.

Simultaneously with the start of pumping lubricant, the robot control device 23 starts a calculation of the injection quantity of lubricant injected into the lubricant injecting place G based on the flow rate information sent from the flow rate sensor 44 (Step S5).

The calculated injection quantity which is calculated at Step S5 is compared with a target injection quantity corresponding to the target filler port 117a (Step S6). Steps S5 and S6 are repeated, for example, at a given interval until the calculated injection quantity reaches the corresponding target injection quantity (NO at Step S6).

When the calculated injection quantity reaches the corresponding target injection quantity (YES at Step S6), the robot control device 23 stops the injection of lubricant from the target filler port 117a to the lubricant injecting place G (Step S7). Specifically, the robot control device 23 sends a signal for stopping the pumping of lubricant to the lubricant pumping device 24 to stop the pumping of lubricant. Thus, the injection of lubricant from the target filler port 117a is completed.

Then, if there is a filler port 117 into which lubricant is not injected, the filler port 117 is set as the target filler port 117a, and the control transits to Step S2 (NO at Step S8). Thus, the discharge part 43 is sequentially connected to the plurality of filler ports 117 which the target machine has, and when the injections of lubricant through all the filler ports 117 are completed (YES at Step S8), the robot control device 23 ends the lubricant injecting operation by the lubricant injection system 1. Note that, although the order of injecting lubricant into the lubricant injecting places G1-G6 is based on the information stored in the memory 51, it does not need to be the order of the lubricant injecting places G1-G6.

In the lubricant injection system 1 according to this embodiment, the operation of the robotic arm 22 is controlled by the robot control device 23 to connect the discharge part 43 of the lubricant injecting hand 4 to the filler port 117 of the articulated robot 100 which is the target machine. Thus, it becomes unnecessary for a worker to manually attach and detach the discharge part 43 to/from the filler port 117. Therefore, labor of the injecting operation of lubricant into the filler port 117 is reduced.

Moreover, the robot control device 23 calculates the injection quantity injected into the lubricant injecting place G based on the flow rate information sent from the flow rate sensor 44. Since the pumping of lubricant is stopped when the calculated injection quantity reaches the corresponding target injection quantity, an exact quantity of lubricant can be injected into each filler port 117.

Moreover, in the lubricant injection system 1 according to this embodiment, the discharge part 43 is sequentially connected to the filler port 117 by the robotic arm 22. Thus, even if the plurality of filler ports 117 are scatteringly provided in the target machine similar to the articulated robot 100, a simplified system having only one lubricant pumping channel which leads lubricant from the lubricant pumping device 24 to the discharge part 43 can be established.

Moreover, in the lubricant injection system 1 according to this embodiment, the series of lubricant injecting operations, such as the connection of the discharge part 43 to the filler ports 117 which the target machine has, the start of injecting lubricant to the lubricant injecting place G, the calculation of the injection quantity and the comparison of the injection quantity with the target injection quantity, the stop of injection, and the movement of the discharge part 43 to another filler port, is all executable with the control signals from the robot control device 23. That is, the operator who performs the lubricant injecting operation can only operate the robot control device 23 to perform the lubricant injecting operation to all the filler ports 117 of the target machine. Moreover, if the target machine is placed in a given state and necessary information, such as the target injection quantity of the filler port 117, is set to the robot control device 23 beforehand, the operator who performs the lubricant injecting operation can complete the lubricant injecting operation of the target machine by inputting only the start instruction into the robot control device 23 for the lubricant injecting operation.

Furthermore, the target machine is placed on the rotary turntable 26 of which rotation is driven. Thus, even if the hand of the articulated robot 2 is unable to be connected to the filler port 117 while the target machine remains in a state when it is placed (the position and the orientation) due to a restriction of the operating range of the robotic arm 22 etc., it is possible to connect the discharge part 43 to all the filler ports 117 which the target machine has, by cooperatively operating the turntable 26 and the articulated robot 2.

The embodiment described above is illustration at all points and is not to be considered to be restrictive. The scope of the present disclosure is indicated by not the above description but the appended claims, and it is intended to include all the changes thereof within the meaning and scope of the equivalents of the claims.

For example, although the target machine is the articulated robot 100 in the above embodiment, it is not limited to this structure and the lubricant injection of the present disclosure is applicable to industrial machines provided with various mechanical elements, such as gears and bearings. Moreover, although lubricant is grease in the above embodiment, it is not limited to grease, but may be lubricating oil, for example.

DESCRIPTION OF REFERENCE CHARACTERS

1 Lubricant Injection System
2 Articulated Robot
21 Pedestal
22 Robotic Arm
23 Robot Control Device
24 Lubricant Pumping Device
25 Upstream Lubricant Pumping Channel
31 First Arm Body
32 Second Arm Body
33 Third Arm Body
34 Fourth Arm Body
35 Fifth Arm Body
36 Sixth Arm Body
4 Lubricant Injecting Hand
42 Downstream Lubricant Pumping Channel
43 Discharge Part
44 Flow Rate Sensor
100 Articulated Robot (Target Machine)
117 Filler Port
G1-G6 Lubricant Injecting Place

What is claimed is:

1. A lubricant injection system configured to inject lubricant into a target machine having a plurality of filler ports, comprising:
    a pedestal;
    a robotic arm including a plurality of arm bodies sequentially coupled from the pedestal;
    a lubricant injecting hand, having a discharge part configured to be sequentially coupled to each of the plurality of filler ports and discharge lubricant, and attached to a tip-end part of the robotic arm so as to be attachable thereto and detachable therefrom;
    a robot control device configured to control operation of the robotic arm;
    a lubricant pumping device, of which pumping of lubricant is controlled by the robot control device;
    a lubricant pumping channel configured to lead lubricant from the lubricant pumping device to the discharge part; and
    a flow rate sensor provided to the lubricant pumping channel and configured to send the detected flow rate information to the robot control device,
    wherein the robot control device stores a target injection quantity corresponding to each of the plurality of filler ports,
    wherein, when the discharge part is connected to any one of the plurality of filler ports, the robot control device controls the lubricant pumping device to start the pumping of lubricant,
    wherein the robot control device calculates an injection quantity of lubricant injected from the filler port connected to the discharge part based on the flow rate information sent from the flow rate sensor, and
    wherein, when the calculated injection quantity reaches the target injection quantity corresponding to the filler port connected to the discharge part, the robot control device controls the lubricant pumping device so as to stop the pumping of lubricant.

* * * * *